(12) United States Patent
Mohri et al.

(10) Patent No.: US 8,968,950 B2
(45) Date of Patent: Mar. 3, 2015

(54) METHOD OF STARTING OPERATION OF SOLID POLYMER ELECTROLYTE FUEL CELL

(75) Inventors: Masahiro Mohri, Utsunomiya (JP); Yasunori Kotani, Utsunomiya (JP); Chikara Iwasawa, Saitama (JP); Junji Uehara, Utsunomiya (JP); Hiroto Chiba, Utsunomiya (JP); Osamu Ohgami, Utsunomiya (JP); Hiroaki Ohta, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 479 days.

(21) Appl. No.: 13/109,739

(22) Filed: May 17, 2011

(65) Prior Publication Data

US 2011/0287331 A1    Nov. 24, 2011

(30) Foreign Application Priority Data

May 18, 2010 (JP) .................................. 2010-114712
Jan. 17, 2011 (JP) .................................. 2011-006688

(51) Int. Cl.
*H01M 8/04*      (2006.01)

(52) U.S. Cl.
CPC ............ *H01M 8/04223* (2013.01); *H01M 8/04* (2013.01); *Y02E 60/50* (2013.01)
USPC ....................................... 429/429

(58) Field of Classification Search
None
See application file for complete search history.

(56) References Cited

U.S. PATENT DOCUMENTS

2008/0292930 A1* 11/2008 Oda et al. .................. 429/26
2009/0169929 A1    7/2009 Matsubara et al.

FOREIGN PATENT DOCUMENTS

| JP | 2005-149838 | | 6/2005 |
|---|---|---|---|
| JP | 2005149838 A | * | 6/2005 |
| JP | 2009-163919 | | 7/2009 |

* cited by examiner

*Primary Examiner* — Ula C. Ruddock
*Assistant Examiner* — Daniel Gatewood
(74) *Attorney, Agent, or Firm* — Nelson Mullins Riley & Scarborough LLP; Anthony A. Laurentano (57) ABSTRACT

A method of starting operation of a fuel cell stack includes the steps of performing gas replacement by supplying a fuel gas to a fuel gas flow field from a downstream side of the fuel gas flow field through a fuel gas discharge passage, and supplying an oxygen-containing gas to an oxygen-containing gas flow field from an upstream side of the oxygen-containing gas flow field through an oxygen-containing gas supply passage. After the step of performing gas replacement, normal power generation is carried out by supplying the fuel gas to the fuel gas flow field from an upstream side of the fuel gas flow field through a fuel gas supply passage, and supplying the oxygen-containing gas to the oxygen-containing gas flow field from the upstream side of the oxygen-containing gas flow field through the oxygen-containing gas supply passage.

3 Claims, 10 Drawing Sheets

METHOD OF STARTING OPERATION OF SOLID POLYMER ELECTROLYTE FUEL CELL

CROSS-REFERENCE TO RELATED APPLICATION

This application is based upon and claims the benefit of priority from Japanese Patent Applications No. 2010-114712 filed on May 18, 2010 and No. 2011-006688 filed on Jan. 17, 2011, of which the contents are incorporated herein by reference.

BACKGROUND OF THE INVENTION

1. Field of the Invention

The present invention relates to a method of starting operation of a solid polymer electrolyte fuel cell, which generates electrical energy by means of electrochemical reactions occurring between an oxygen-containing gas and a fuel gas. The solid polymer electrolyte fuel cell is formed by stacking a membrane electrode assembly and separators. The membrane electrode assembly includes a cathode and an anode as a pair of electrodes, with an electrolyte interposed between the cathode and the anode. The solid polymer electrolyte fuel cell has an oxygen-containing gas flow field for supplying an oxygen-containing gas to the cathode, and a fuel gas flow field for supplying a fuel gas to the anode.

2. Description of the Related Art

For example, a solid polymer electrolyte fuel cell employs an electrolyte membrane. The electrolyte membrane is a polymer ion exchange membrane. The electrolyte membrane is interposed between an anode and a cathode in order to form a membrane electrode assembly (MEA). The membrane electrode assembly is sandwiched between a pair of separators, so as to form a unit cell for generating electricity. In use, normally, a predetermined number of unit cells are stacked together to make up a fuel cell stack. The fuel cell stack is mounted in a vehicle, for example.

In the fuel cell, a fuel gas flow field is formed on a surface of one separator, which faces the anode, for supplying fuel gas to the anode, and an oxygen-containing gas flow field is formed on a surface of the other separator, which faces the cathode, for supplying oxygen-containing gas to the cathode. Further, a coolant flow field is formed between adjacent separators of the fuel cells for supplying a coolant into electrode areas of the separators.

In this type of fuel cell, water is produced during power generation. When power generation is stopped, the water, which was produced during power generation, tends to be retained on the downstream side of the oxygen-containing gas flow field and the fuel gas flow field. Further, when operation of the fuel cell is stopped, in a case where scavenging of the oxygen-containing gas flow field and the fuel gas flow field is performed using air, the cathode may become degraded undesirably, in particular, due to a high potential on the downstream side of the oxygen-containing gas flow field at a time when operation of the fuel cell is started.

In an attempt to address this problem, a fuel cell system disclosed in Japanese Laid-Open Patent Publication No. 2005-149838 is known. The fuel cell system includes a fuel cell for generating electrical energy using a fuel gas, which is supplied to a fuel gas flow field, and an oxygen-containing gas, which is supplied to an oxygen-containing gas flow field. The fuel cell system also includes a first fuel gas supply means for supplying fuel gas to the fuel gas flow field, an oxygen-containing gas supply means for supplying oxygen-containing gas to the oxygen-containing gas flow field, and a second fuel gas supply means for selectively supplying fuel gas to the oxygen-containing gas flow field.

When operation of the fuel cell system is started, supply of fuel gas to the oxygen-containing gas flow field is started before the fuel gas flows over at least the fuel gas flow field. Further, after the fuel gas starts to flow over at least the fuel gas flow field, switching is carried out in order to supply the oxygen-containing gas to the oxygen-containing gas flow field.

In this manner, gas that remains when the fuel cell system is started is utilized to suppress a corrosive reaction of carbon in the electrodes of the fuel cell. According to the disclosure of Japanese Laid-Open Patent Publication No. 2005-149838, degradation of the cathode (oxygen-containing gas electrode), which may occur when the starting operation is carried out, is suppressed effectively without requiring the system to be large in size.

In Japanese Laid-Open Patent Publication No. 2005-149838, fuel gas is supplied over the entire fuel gas flow field, as well as over the entire oxygen-containing gas flow field when operation of the fuel cell system is started. Therefore, the amount of wastefully consumed fuel gas is large, which is uneconomical. Further, in the cathode system, catalytic combustion tends to occur due to mixing of hydrogen and oxygen, resulting in degradation of the electrode.

SUMMARY OF THE INVENTION

The present invention has been made to solve the aforementioned problems. An object of the present invention is to provide a method of starting operation of a solid polymer electrolyte fuel cell, including simple and economical steps, which suitably suppress degradation of the fuel cell.

The present invention relates to a method of starting operation of a solid polymer electrolyte fuel cell, in which electrical energy is generated by electrochemical reactions that take place between an oxygen-containing gas and a fuel gas. The solid polymer electrolyte fuel cell is formed by stacking a membrane electrode assembly and separators. The membrane electrode assembly includes a cathode and an anode as a pair of electrodes, and an electrolyte interposed between the cathode and the anode. The solid polymer electrolyte fuel cell has an oxygen-containing gas flow field for supplying oxygen-containing gas to the cathode, and a fuel gas flow field for supplying fuel gas to the anode.

The method includes the steps of performing gas replacement by supplying the fuel gas to the fuel gas flow field from a downstream side of the fuel gas flow field, and supplying the oxygen-containing gas to the oxygen-containing gas flow field from an upstream side of the oxygen-containing gas flow field, and after the step of performing gas replacement, performing normal power generation by supplying the fuel gas to the fuel gas flow field from an upstream side of the fuel gas flow field, and supplying the oxygen-containing gas to the oxygen-containing gas flow field from the upstream side of the oxygen-containing gas flow field.

According to the present invention, first, the fuel gas is supplied to the fuel gas flow field from a downstream side of the fuel gas flow field. Therefore, even though water tends to be retained easily on the downstream side of the fuel gas flow field, the water can be moved toward the upstream side of the fuel gas flow field where only a small amount of water is present. Therefore, the occurrence of a high potential on the downstream side of the oxygen-containing gas flow field is suitably suppressed, and the amount of fuel gas that is discarded wastefully can be reduced reliably. Thus, with simple and economical steps, degradation of the fuel cell stack when operation of the fuel cell stack is started can suitably be suppressed.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
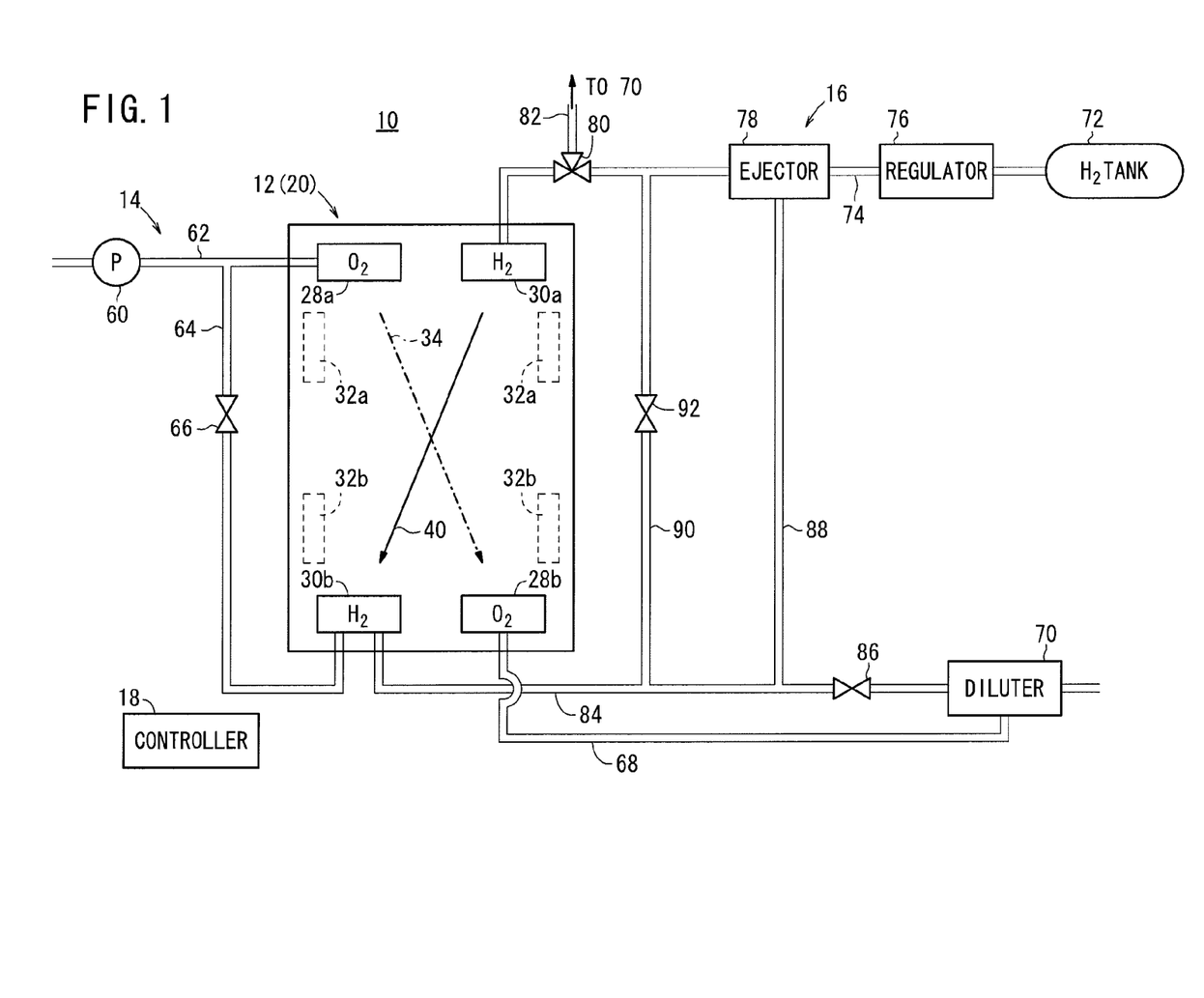
FIG. 1 is a diagram schematically showing the structure of a fuel cell system, to which a method of starting operation of the fuel cell system according to an embodiment of the present invention is applied.

As shown in FIG. 1, a fuel cell system 10, to which a method of starting operation of the fuel cell system 10 according to an embodiment of the present invention is applied, includes a fuel cell stack 12, an oxygen-containing gas supply apparatus 14 for supplying an oxygen-containing gas to the fuel cell stack 12, a fuel gas supply apparatus 16 for supplying a fuel gas to the fuel cell stack 12, a coolant supply apparatus (not shown) for supplying a coolant to the fuel cell stack 12, and a controller 18 for controlling operations of the fuel cell system 10 as a whole.

Figure 2:
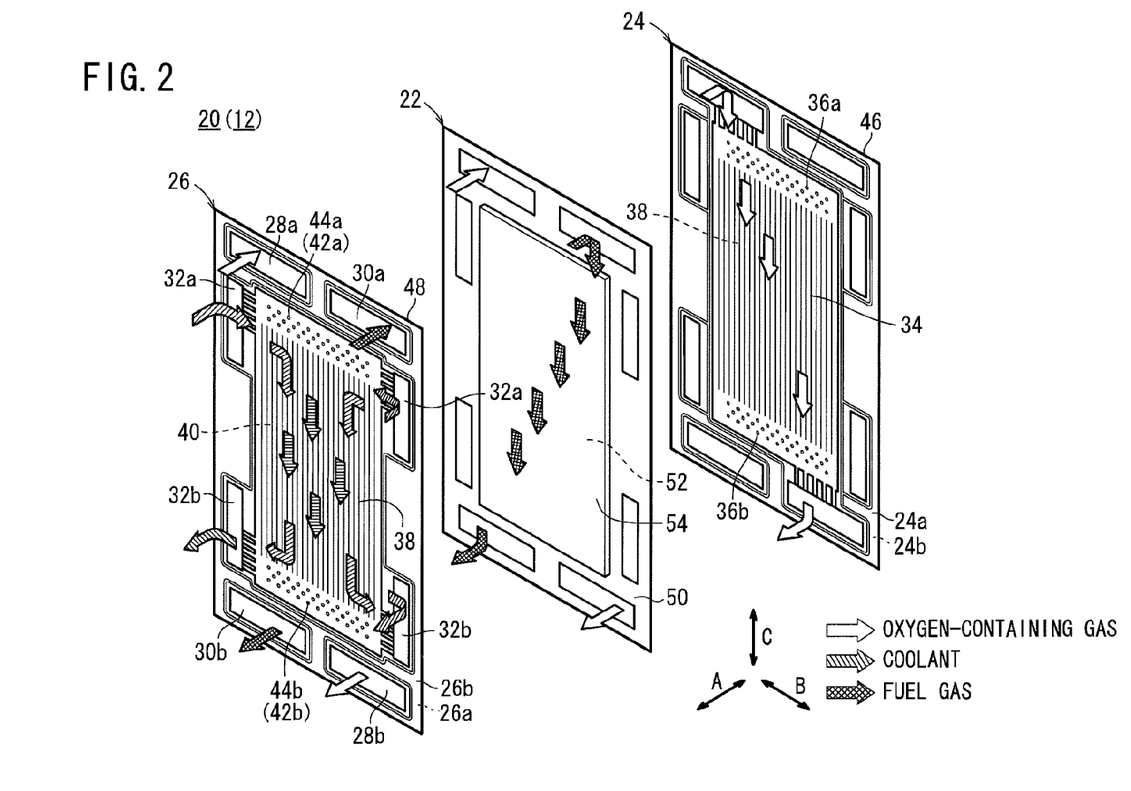
FIG. 2 is an exploded perspective view showing a fuel cell of the fuel cell system.

The fuel cell stack 12 is formed by stacking a plurality of fuel cells 20. As shown in FIG. 2, each of the fuel cells 20 includes a membrane electrode assembly 22, and a first separator 24 and a second separator 26 sandwiching the membrane electrode assembly 22 therebetween.

For example, the first and second separators 24, 26 are steel plates, stainless steel plates, aluminum plates, plated steel sheets, or metal plates, which have anti-corrosive surfaces formed by carrying out a surface treatment thereon. Each of the first separator 24 and the second separator 26 has a rectangular shape as viewed in plan, and is formed by corrugating a metal thin plate under pressure to have grooves and ridges therein as viewed in cross section. Instead of metal separators, for example, carbon separators may be used as the first separator 24 and the second separator 26.

Each of the first separator 24 and the second separator 26 has a rectangular shape. Long sides of the first and second separators 24, 26 extend in the direction of gravity, as indicated by the arrow C, and short sides of the first and second separators 24, 26 extend in a horizontal direction as indicated by the arrow B. Alternatively, long sides of the first and second separators 24, 26 may extend in the horizontal direction, while the short sides of the first and second separators 24, 26 extend in the direction of gravity.

At an upper end of the fuel cell 20 in a longitudinal direction indicated by the arrow C, an oxygen-containing gas supply passage 28a is provided for supplying an oxygen-containing gas, and a fuel gas supply passage 30a is provided for supplying a hydrogen-containing gas. The oxygen-containing gas supply passage 28a and the fuel gas supply passage 30a extend through the fuel cells 20 in the direction indicated by the arrow A.

At a lower end of the fuel cell 20 in the longitudinal direction, a fuel gas discharge passage 30b is provided for discharging the fuel gas, and an oxygen-containing gas discharge passage 28b is provided for discharging the oxygen-containing gas. The fuel gas discharge passage 30b and the oxygen-containing gas discharge passage 28b extend through the fuel cell 20 in the direction indicated by the arrow A.

At upper positions on both sides of the fuel cell 20 in the lateral direction, as indicated by the arrow B, two coolant supply passages 32a are provided at symmetrical locations for supplying a coolant. The coolant supply passages 32a extend through the fuel cell 20 in the direction indicated by the arrow A. At lower positions on both sides of the fuel cell 20, two coolant discharge passages 32b are provided at symmetrical locations for discharging the coolant. The coolant discharge passages 32b extend through the fuel cell 20 in the direction indicated by the arrow A.

On a surface 24a of the first separator 24 that faces the membrane electrode assembly 22, the first separator 24 has an oxygen-containing gas flow field 34 that extends vertically, and which serves to connect the oxygen-containing gas supply passage 28a and the oxygen-containing gas discharge passage 28b. An inlet buffer 36a and an outlet buffer 36b are provided adjacent to the inlet and the outlet of the oxygen-containing gas flow field 34. Plural embossments are formed in the inlet buffer 36a and the outlet buffer 36b. A coolant flow field 38, to be described later, is partially formed on a surface 24b of the first separator 24 opposite to the surface 24a.

On a surface 26a of the second separator 26 that faces the membrane electrode assembly 22, the second separator 26 has a fuel gas flow field 40 that extends vertically, and which serves to connect the fuel gas supply passage 30a and the fuel gas discharge passage 30b. An inlet buffer 42a and an outlet buffer 42b are provided adjacent to the inlet and the outlet of the fuel gas flow field 40. Plural embossments are formed in the inlet buffer 42a and the outlet buffer 42b.

The coolant flow field 38, which is connected to the coolant supply passages 32a and the coolant discharge passages 32b, is formed between a surface 26b of the second separator 26 and the surface 24b of the first separator 24. An inlet buffer 44a and an outlet buffer 44b are provided adjacent to the inlet and the outlet of the coolant flow field 38. Plural embossments are formed in the inlet buffer 44a and the outlet buffer 44b.

A first seal member 46 is formed around the first separator 24 integrally with the surfaces 24a, 24b of the first separator 24. A second seal member 48 is formed around the second separator 26 integrally with the surfaces 26a, 26b of the second separator 26. The first and second seal members 46, 48 are made, for example, from a sealant material, a cushion material or a packing material, such as elastic EPDM (ethylene propylene diene monomer), NBR (nitrile butadiene rubber), fluoro rubber, silicone rubber, fluoro silicone rubber, butyl rubber (isobutene-isoprene rubber), natural rubber, styrene rubber, chloroprene rubber, or acrylic rubber.

The membrane electrode assembly 22 includes a cathode 52, an anode 54, and a solid polymer electrolyte membrane 50 interposed between the cathode 52 and the anode 54. The solid polymer electrolyte membrane 50 may be formed by impregnating a thin membrane of perfluorosulfonic acid with water, for example.

Each of the cathode 52 and the anode 54 has a gas diffusion layer, such as carbon paper, and an electrode catalyst layer made up of a platinum alloy supported on porous carbon particles. The carbon particles are deposited uniformly on the surface of the gas diffusion layer. The electrode catalyst layer of the cathode 52 and the electrode catalyst layer of the anode 54 are fixed to opposite surfaces of the solid polymer electrolyte membrane 50, respectively.

As shown in FIG. 1, the oxygen-containing gas supply apparatus 14 includes an air pump 60 for compressing atmospheric air and for supplying the compressed air. The air pump 60 is provided in an air supply channel 62. The air supply channel 62 is connected to an oxygen-containing gas supply passage 28a of the fuel cell stack 12. An air branch channel 64 branches from a position in the middle of the air supply channel 62. An opening/closing valve 66 is provided in the air branch channel 64. The air branch channel 64 is connected to the fuel gas discharge passage 30b of the fuel cell stack 12.

The oxygen-containing gas supply apparatus 14 has an air discharge channel 68 connected to the oxygen-containing gas discharge passage 28b. The air discharge channel 68 is connected to a diluter 70.

The fuel gas supply apparatus 16 includes a hydrogen tank 72 for storing high pressure hydrogen (hydrogen-containing gas). The hydrogen tank 72 is connected through a hydrogen supply channel 74 to the fuel gas supply passage 30a of the fuel cell stack 12. A regulator 76, an ejector 78, and a three-way valve 80 are provided in the hydrogen supply channel 74. A discharge pipe 82, for example, which is connected to the three-way valve 80, is connected to the diluter 70 for diluting the exhaust gas using air.

The fuel gas supply apparatus 16 has a fuel gas discharge channel 84, which is connected to the fuel gas discharge passage 30b. The fuel gas discharge channel 84 is connected to the diluter 70 through an opening/closing valve 86, and the fuel gas discharge channel 84 is connected to a hydrogen circulation channel 88. The hydrogen circulation channel 88 is connected to an ejector 78.

Hydrogen gas is supplied from the hydrogen tank 72 to the ejector 78, and then, the hydrogen gas is supplied into the fuel cell stack 12 through the hydrogen supply channel 74. Exhaust gas, which contains hydrogen gas that was consumed in the fuel cell stack 12, is sucked from the hydrogen circulation channel 88, and is supplied again as fuel gas into the fuel cell stack 12.

The fuel gas discharge channel 84 is connected through the fuel gas branch channel 90 to the hydrogen supply channel 74, between the ejector 78 and the three-way valve 80. An opening/closing valve 92 is provided in the fuel gas branch channel 90.

Figure 3:
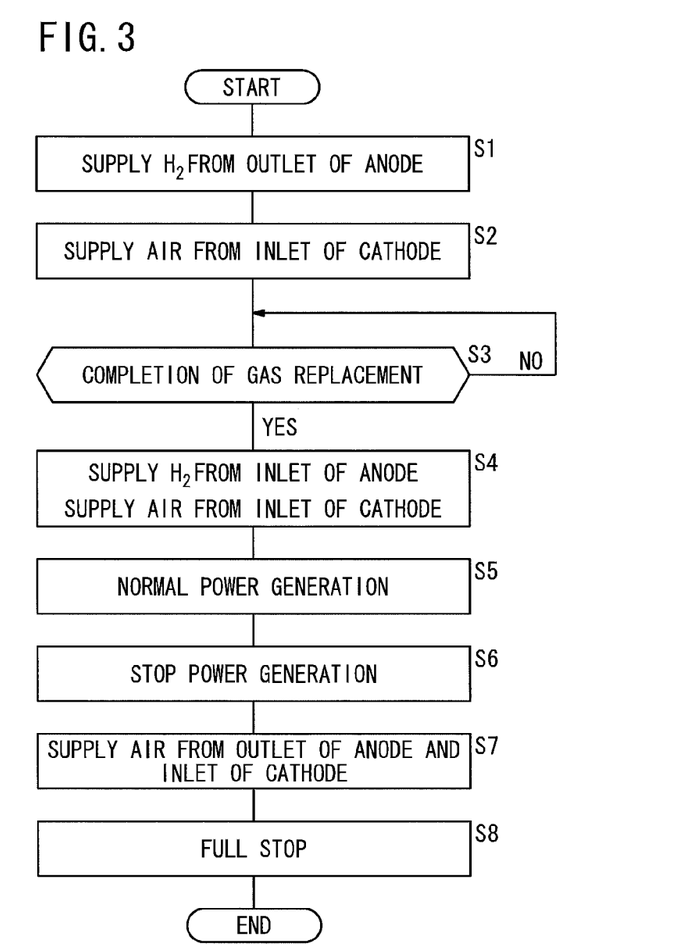
FIG. 3 is a flow chart showing the method of starting operation of the fuel cell system.

With reference to the flow chart shown in FIG. 3, operations of the fuel cell system 10 will be described below in connection with a method for starting operation of the fuel cell system 10 according to the embodiment of the present invention.

In the fuel cell system 10, as described later, when operation of the fuel cell system 10 is stopped, the oxygen-containing gas flow field 34 and the fuel gas flow field 40 of the fuel cell stack 12 are filled, for example, with the oxygen-containing gas. Thus, when operation of the fuel cell system 10 is started, first, the fuel gas is supplied from the downstream side, i.e., from the fuel gas discharge passage 30b, of each of the fuel gas flow fields 40 that make up the fuel cell stack 12 (step S1).

Figure 4:
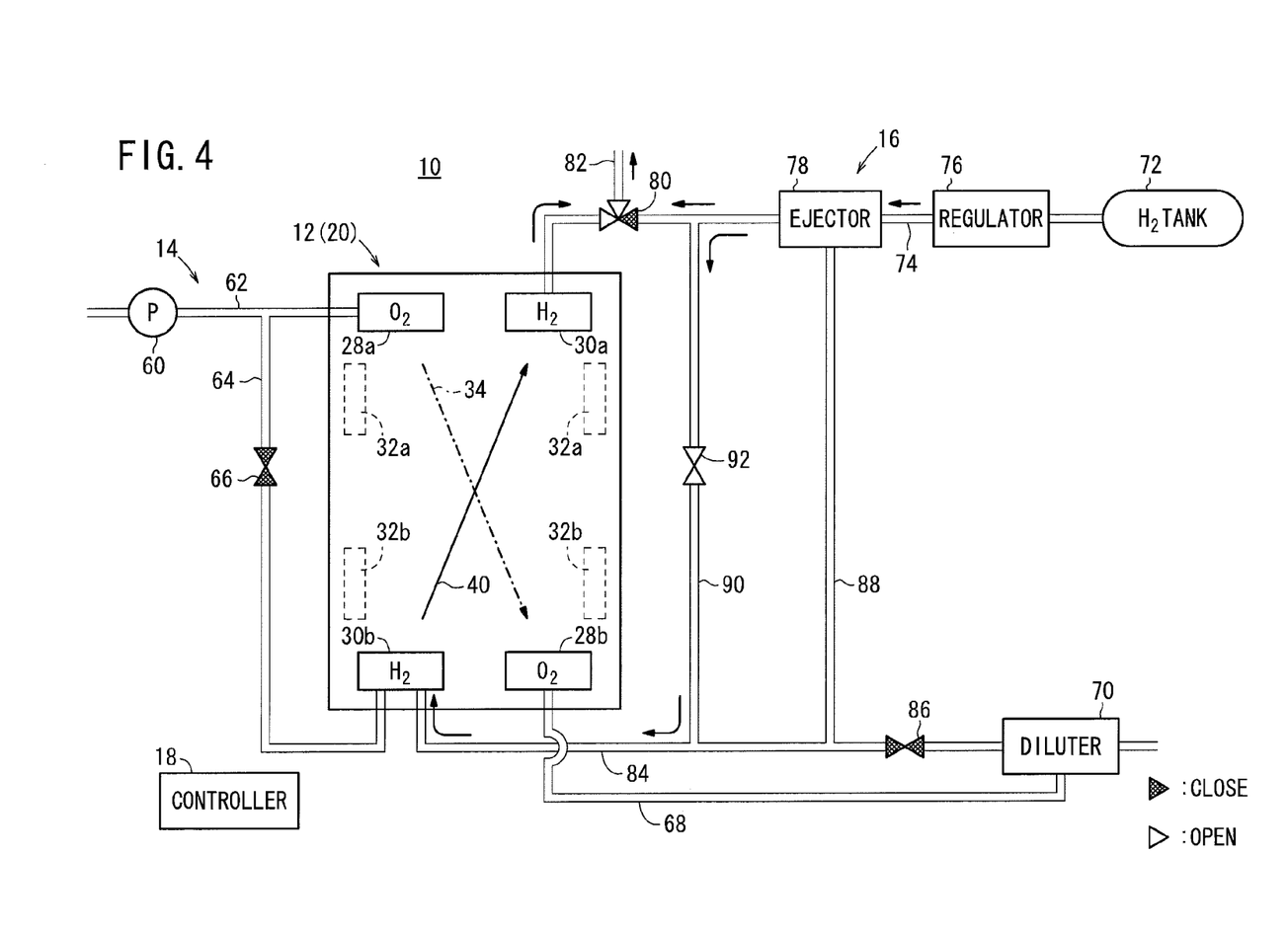
FIG. 4 is a diagram showing a gas replacement process carried out on an anode side of the fuel cell system.

More specifically, as shown in FIG. 4, the opening/closing valves 66, 86 are closed, and the opening/closing valve 92 is opened. Further, by switching operation of the three-way valve 80, the connection between the hydrogen supply channel 74 and the fuel gas supply passage 30a is interrupted, and the fuel gas supply passage 30a becomes connected to the discharge pipe 82.

Therefore, in the fuel gas supply apparatus 16, fuel gas (hydrogen-gas) is supplied from the hydrogen tank 72 to the hydrogen supply channel 74. After the fuel gas has been depressurized by the regulator 76, the fuel gas flows through the fuel gas branch channel 90, and is supplied from the fuel gas discharge channel 84 into each of the fuel gas discharge passages 30b of the fuel cell stack 12.

In the structure of the present invention, air that fills the fuel gas flow field 40 moves from the downstream side to the upstream side of the fuel gas flow field 40, and the fuel gas is discharged from the fuel gas supply passage 30a into the discharge pipe 82. The discharged air and fuel gas are supplied to the diluter 70 as necessary.

Then, supply of the fuel gas is started. After elapse of a predetermined period of time, supply of the oxygen-containing gas to each of the oxygen-containing gas flow fields 34 is started (step S2). The predetermined period of time referred to herein implies a given period of time, which is required for gas to be replaced in the fuel gas flow field 40 using the fuel gas. This period of time can be determined beforehand by measuring the time experimentally.

In the oxygen-containing gas supply apparatus 14, by operation of the air pump 60, air (oxygen-containing gas) is supplied from the air supply channel 62 into each of the oxygen-containing gas supply passages 28a of the fuel cell stack 12. Therefore, air is supplied from the oxygen-containing gas supply passage 28a into the oxygen-containing gas flow field 34 in each of the fuel cells 20. Discharged air, which is discharged from the oxygen-containing gas flow field 34, is supplied to the diluter 70 through the air discharge channel 68.

In step S3, it is determined whether or not the above gas replacement process has been completed. More specifically, it is determined whether or not the predetermined period of time (i.e., a period of time required for completion of gas replacement, which can be determined beforehand by measuring the time experimentally) has elapsed. Alternatively, the concentration of hydrogen discharged from the fuel gas supply passage 30a may be detected in order to determine completion of the gas replacement process. Meanwhile, in the oxygen-containing gas flow field 34, it is determined whether or not air has been supplied for the predetermined period of time, or alternatively, the concentration of oxygen discharged from the oxygen-containing gas discharge passage 28b may be detected in order to determine completion of the gas replacement process.

Figure 5:
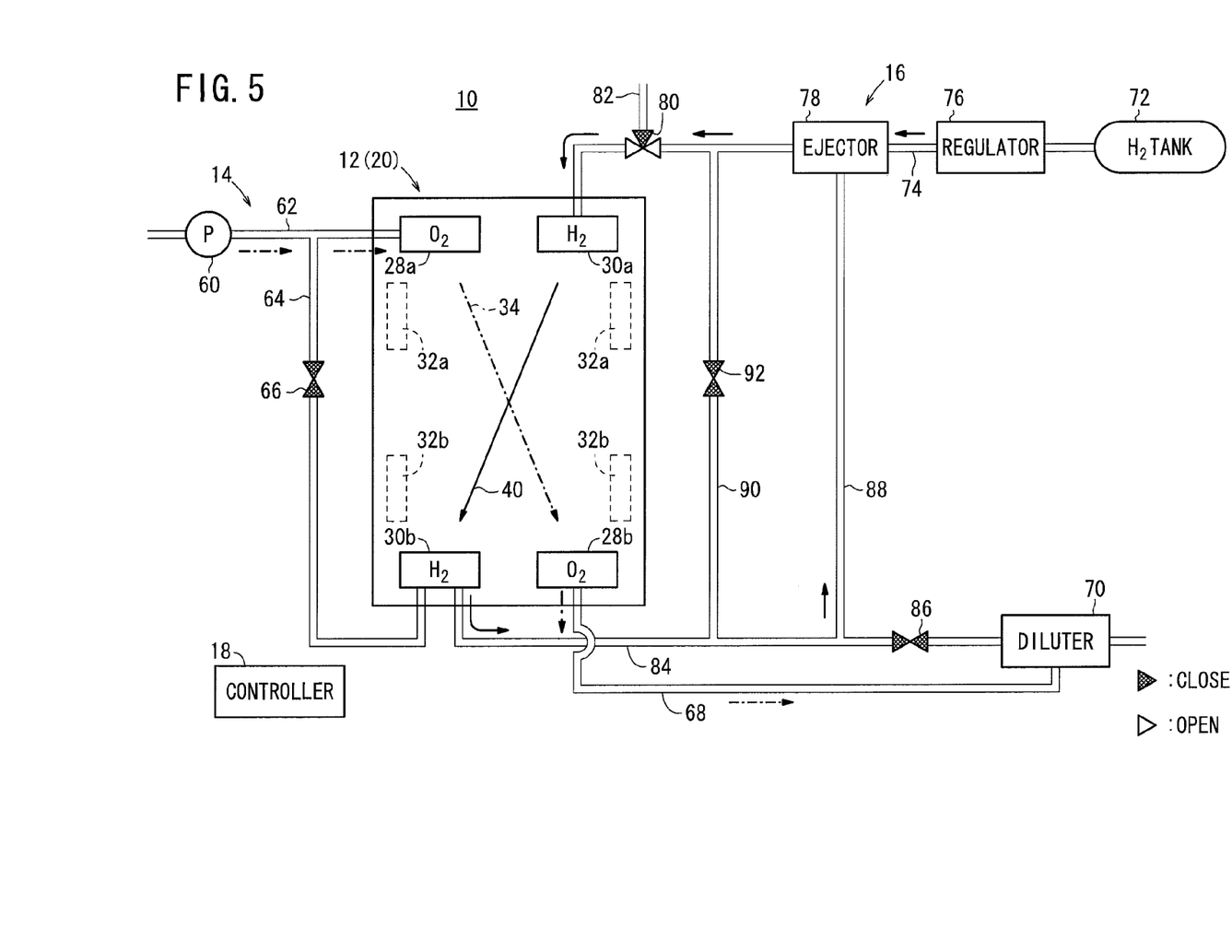
FIG. 5 is a diagram showing a state at a time when the fuel cell system generates power.

Next, the routine proceeds to step S4, in which the fuel gas is supplied from the fuel gas supply passage 30a, and the oxygen-containing gas is supplied from the oxygen-containing gas supply passage 28a. More specifically, as shown in FIG. 5, by closing the opening/closing valves 66, 86 and 92, and by switching operation of the three-way valve 80, the hydrogen supply channel 74 becomes connected to the fuel gas supply passage 30a.

Then, in step S5, power generation (i.e., a normal power generation process) of the fuel cell stack 12 is started. During power generation, as shown in FIG. 2, an oxygen-containing gas is supplied to the oxygen-containing gas supply passage 28a, and a fuel gas such as a hydrogen-containing gas is supplied to the fuel gas supply passage 30a. Further, pure water, ethylene glycol, or oil is supplied to the coolant supply passages 32a.

Thus, the oxygen-containing gas from the oxygen-containing gas supply passage 28a flows into the oxygen-containing gas flow field 34 of the first separator 24.

As indicated by the arrow C, the oxygen-containing gas flows along the oxygen-containing gas flow field 34 in the direction of gravity, and the oxygen-containing gas is supplied to the cathode 52 of the membrane electrode assembly 22.

Further, fuel gas is supplied from the fuel gas supply passage 30a into the fuel gas flow field 40 of the second separator 26. The fuel gas flows along the fuel gas flow field 40 in the direction of gravity, as indicated by the arrow C, and the fuel gas is supplied to the anode 54 of the membrane electrode assembly 22.

Thus, in the membrane electrode assembly 22, the oxygen-containing gas, which is supplied to the cathode 52, and the fuel gas, which is supplied to the anode 54, are consumed in electrochemical reactions that take place at catalyst layers of the cathode 52 and the anode 54, for thereby generating electricity.

The oxygen-containing gas, which is consumed at the cathode 52 of the membrane electrode assembly 22, is discharged along the oxygen-containing gas discharge passage 28b in the direction indicated by the arrow A. The oxygen-containing gas is supplied to the diluter 70 through the air discharge channel 68 (see FIG. 5).

As shown in FIG. 2, the fuel gas, which is consumed at the anode 54 of the membrane electrode assembly 22, is discharged along the fuel gas discharge passage 30b in the direction indicated by the arrow A. As shown in FIG. 5, the fuel gas is discharged into the fuel gas discharge channel 84, and is sucked by the ejector 78 through the hydrogen circulation channel 88.

As shown in FIG. 2, the coolant, which is supplied to the pair of coolant supply passages 32a, is guided into the coolant flow field 38 between the first separator 24 and the second separator 26. After the coolant flows temporarily in a horizontal direction, as indicated by the arrow B, the coolant moves in the direction of gravity, as indicated by the arrow C, in order to cool the membrane electrode assembly 22. After the coolant has moved toward both sides in the direction indicated by the arrow B, the coolant is discharged into the pair of coolant discharge passages 32b.

When generation of power by the fuel cell stack 12 is stopped (step S6), the supply of air and the supply of fuel gas to the fuel cell stack 12 both are stopped. The routine then proceeds to step S7 to carry out a scavenging process using air.

Figure 6:
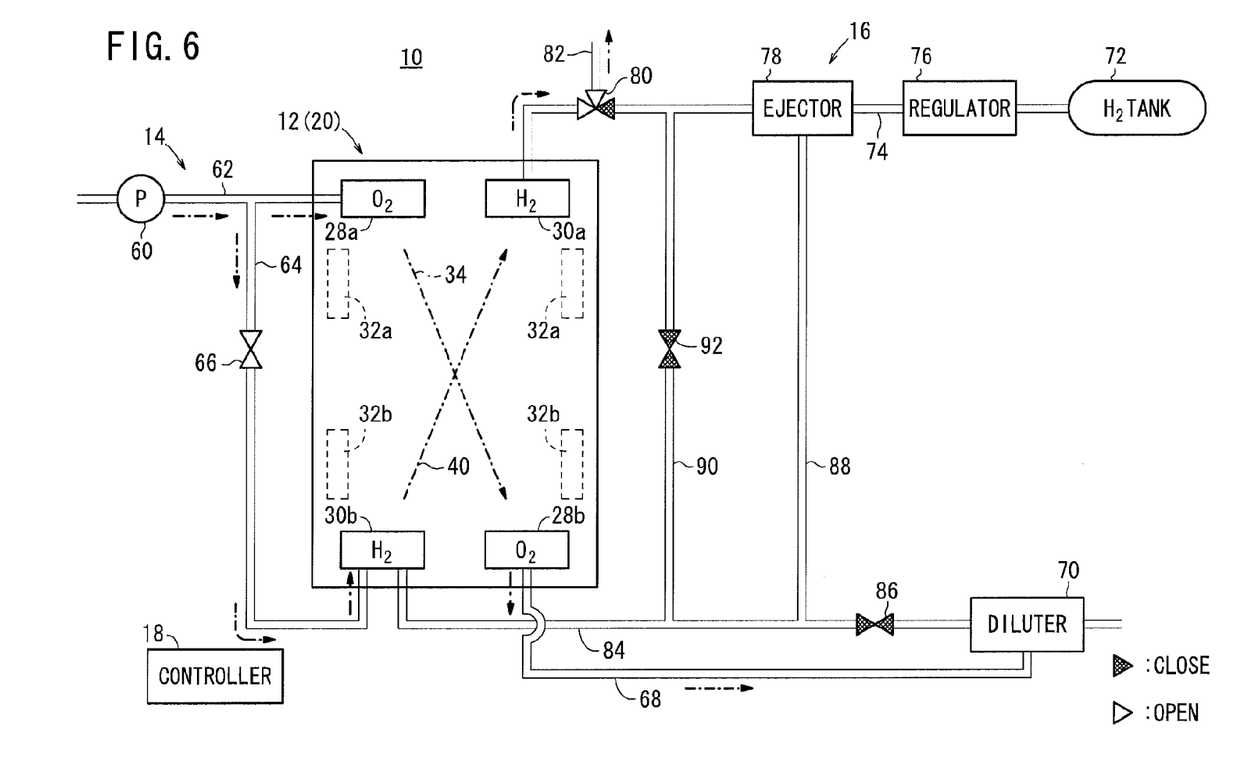
FIG. 6 is a diagram showing a state at a time when a scavenging process is carried out on the fuel cell system.

More specifically, as shown in FIG. 6, the opening/closing valve 66 is opened, while the opening/closing valves 86, 92 are closed. By switching operation of the three-way valve 80, the connection between the hydrogen supply channel 74 and the fuel gas supply passage 30a is interrupted. Therefore, when the air pump 60 supplies air into the air supply channel 62, the air is supplied into each of the oxygen-containing gas supply passages 28a of the fuel cell stack 12, and further is supplied through the air branch channel 64 into each of the fuel gas discharge passages 30b of the fuel cell stack 12.

Thus, in the oxygen-containing gas flow field 34, air is supplied from the upstream side to the downstream side thereof, whereas in the fuel gas flow field 40, air is supplied from the downstream side to the upstream side thereof (see FIG. 6).

After the oxygen-containing gas flow field 34 and the fuel gas flow field 40 have been filled with air, operation of the fuel cell system 10 as a whole is stopped (FULL STOP) (step S8).

When operation of the fuel cell system 10 is stopped, normally, air is supplied into the fuel gas supply passage 30a, and such air is supplied from the upstream side to the downstream side of the fuel gas flow field 40. Therefore, advantageously, water can be discharged smoothly from the fuel gas flow field 40.

Further, after scavenging, the fuel gas flow field 40 may be filled, for example, with hydrogen gas instead of air.

In this case, a large amount of water is produced during power generation of the fuel cell stack 12. The water thus produced tends to be retained on the downstream side of the oxygen-containing gas flow field 34, as well as on the downstream side of the fuel gas flow field 40. Therefore, the amount of water contained in the lower part of the membrane electrode assembly 22 is considerably larger than the amount of water contained in the upper part of the membrane electrode assembly 22.

Figure 7:
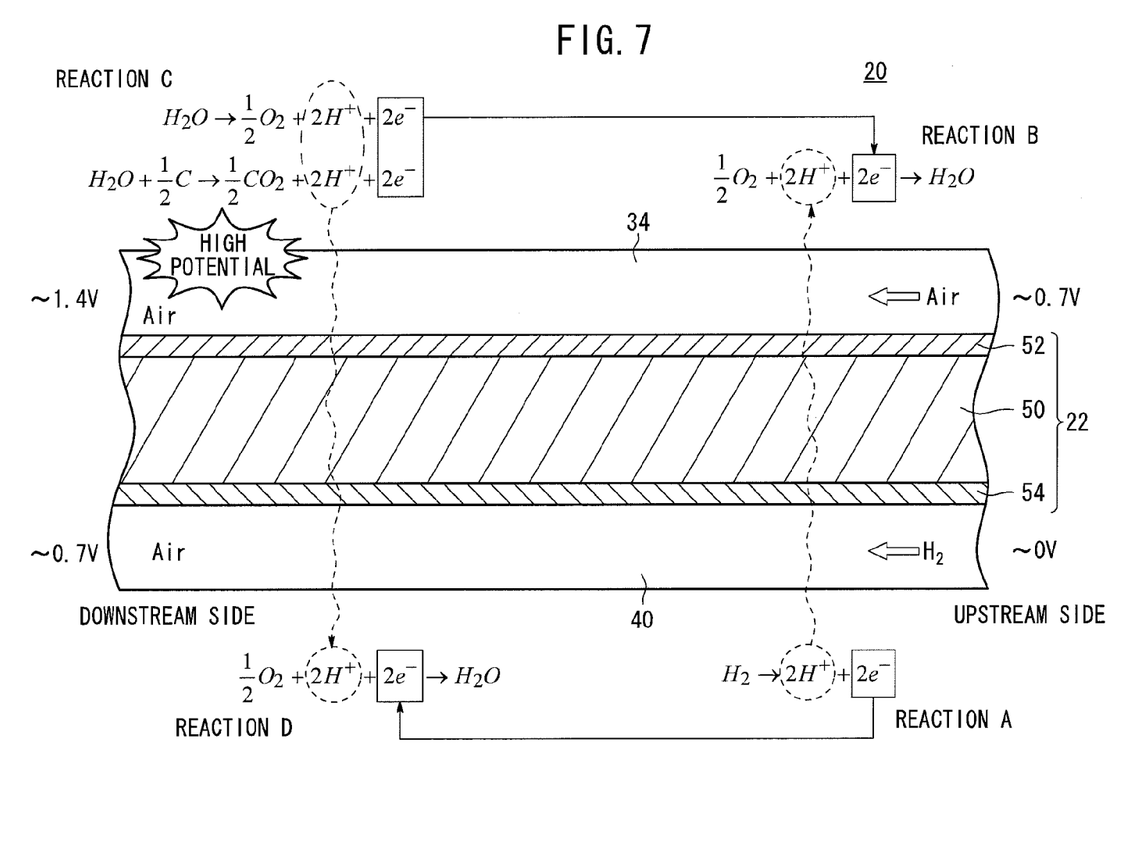
FIG. 7 is a cross sectional view showing potential behaviors in the fuel cell, at a time when operation of the fuel cell system is started.

Therefore, when operation of the fuel cell 20 is started, similar to the conventional method, when oxygen-containing gas (air) is supplied from the upstream side to the downstream side of the oxygen-containing gas flow field 34, and fuel gas (hydrogen gas) is supplied from the upstream side to the downstream side of the fuel gas flow field 40, the potential behaviors shown in FIG. 7 are exhibited (i.e., in order of reaction A, reaction B, reaction C, and reaction D).

More specifically, on the upstream side of the fuel gas flow field 40, when the fuel gas is supplied, the reaction A, i.e., $H_2 \rightarrow 2H^+ + 2e^-$, is induced. Thus, $2H^+$ migrates through the membrane electrode assembly 22 and moves toward the oxygen-containing gas flow field 34. The oxygen-containing gas is supplied to the oxygen-containing gas flow field 34, and the reaction B, i.e., $\frac{1}{2}O_2 + 2H^+ + 2e^- \rightarrow H_2O$, is induced.

Water remaining on the downstream side of the oxygen-containing gas flow field 34 induces the reaction C, i.e., $H_2O \rightarrow \frac{1}{2}O_2 + 2H^+ + 2e^-$ and $H_2O + \frac{1}{2}C$ (C in the electrode catalyst layer)$\rightarrow \frac{1}{2}CO_2 + 2H^+ + 2e^-$. Meanwhile, $2H^+$ migrates from the downstream side of the oxygen-containing gas flow field 34 to the downstream side of the fuel gas flow field 40, so as to induce the reaction D, i.e., $\frac{1}{2}O_2 + 2H^+ + 2e^- \rightarrow H_2O$. The reaction C acts as a rate-determining step. Inasmuch as the amount of water becomes large, all of the reactions A to D are induced and the potential becomes high.

Figure 8:
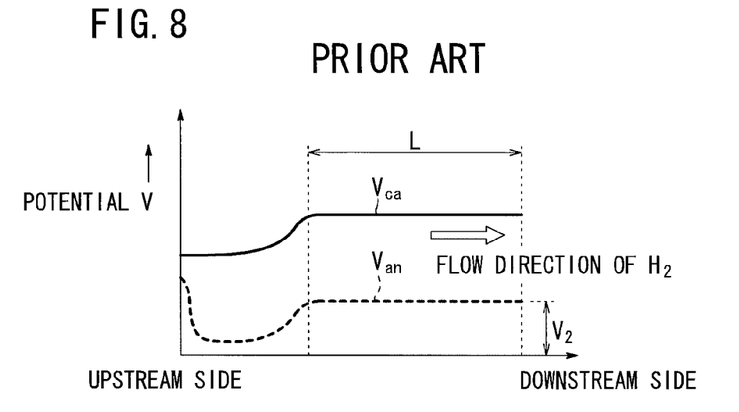
FIG. 8 is a graph showing the potential at a time when operation of a conventional fuel cell system is started.
Figure 9:
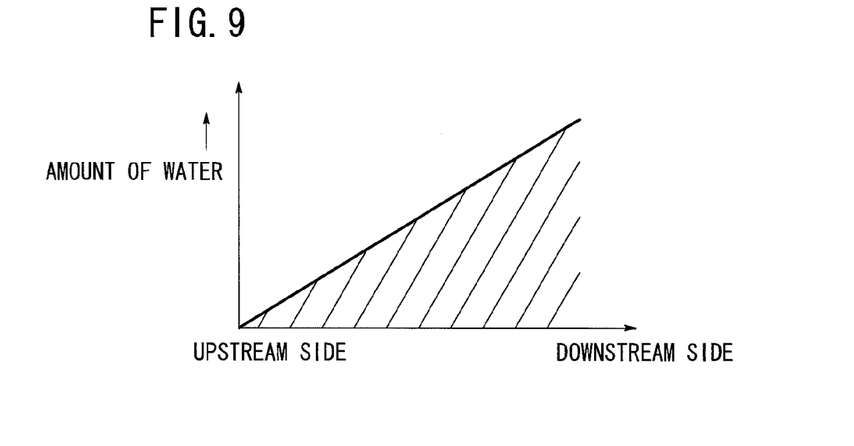
FIG. 9 is a graph showing an amount of water in a membrane electrode assembly at a time when power generation is stopped.

In the conventional method, the cathode potential Vca and the anode potential Van exhibit the relationship shown in FIG. 8. Further, as shown in FIG. 9, the amount of water increases from the upstream side to the downstream side of the flow field.

Therefore, since the upstream side of the fuel gas flow field 40 tends to be dry, the fuel gas, which is supplied to the upstream side of the fuel gas flow field 40, flows easily through the diffusion layer of the anode 54. Thus, considerable time is required for the fuel gas, which is supplied to the upstream side of the fuel gas flow field 40, to move to the downstream side of the fuel gas flow field 40. Consequently, a high potential V2 appears on the downstream side of the flow field for a relatively long period of time L (see FIG. 8).

Figure 10:
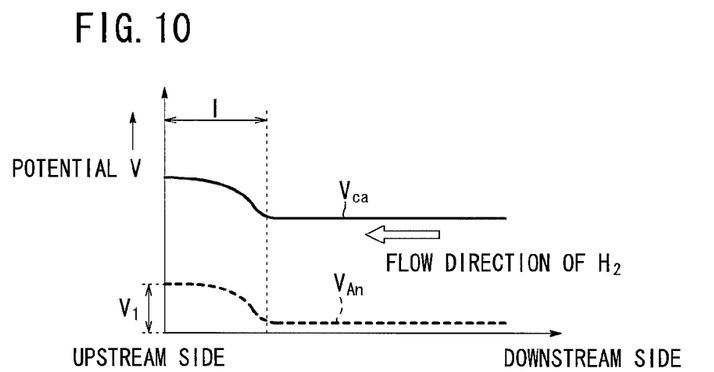
FIG. 10 is a graph showing the potential at a time when operation of the fuel cell system according to the present embodiment is started.

In the present embodiment, first, as shown in FIG. 4, fuel gas is supplied from the downstream side of the fuel gas flow field 40, i.e., from the fuel gas discharge passage 30b to the fuel gas flow field 40. Thus, water tends to be retained in the membrane electrode assembly 22 on the downstream side of the fuel gas flow field 40. In contrast thereto, the amount of retained water is small on the upstream side of the fuel gas flow field 40 of the membrane electrode assembly 22. Therefore, since the progress of reaction C shown in FIG. 7 is slow, as shown in FIG. 10, the upstream side of the flow field has a low potential V1 (V1<V2).

Further, since a large amount of water is present on the downstream side of the fuel gas flow field 40, the fuel gas that is supplied to the downstream side of the fuel gas flow field 40 does not flow through the diffusion layer of the anode 54, and the fuel gas promptly moves to the upstream side of the fuel gas flow field 40. Thus, as shown in FIGS. 8 and 10, the period of time 1, during which the peak potential appears according to the present invention, is significantly shorter in comparison with the period of time L, during which the peak potential appears in the conventional method (1<L).

Therefore, occurrence of a high potential on the downstream side of the oxygen-containing gas flow field 34 is suitably suppressed, and the amount of fuel gas that is discarded wastefully is reliably reduced. Thus, with a simple and economical structure, it is possible to suitably suppress degradation of the fuel cell stack 12 when operation of the fuel cell stack 12 is started.

Further, when the oxygen-containing gas flow field 34 and the fuel gas flow field 40 are scavenged using air, air is supplied from the downstream side of the fuel gas flow field 40. Therefore, although water, which is produced during power generation, tends to be retained on the downstream side of the oxygen-containing gas flow field 34 and the fuel gas flow field 40, according to the structure of the present invention, it is possible for the water to be moved toward the upstream side, whereby uniform water distribution within the membrane electrode assembly 22 is achieved. Thus, degradation of the membrane electrode assembly 22 can suitably be suppressed.

Further, in the present embodiment, the oxygen-containing gas flows through the oxygen-containing gas flow field 34, and the fuel gas flows through the fuel gas flow field 40, from upper to lower positions thereof in the direction of gravity. However, the present invention is not limited in this respect. For example, the oxygen-containing gas may flow in a horizontal direction through the oxygen-containing gas flow field 34, and the fuel gas may flow in a horizontal direction through the fuel gas flow field 40. In this case, the oxygen-containing gas and the fuel gas should flow in parallel in the same direction, and the oxygen-containing gas discharge passage 28b and the fuel gas discharge passage 30b should extend through the same end of the fuel cell stack 12.

While the invention has been particularly shown and described with reference to a preferred embodiment, it will be understood that variations and modifications can be made to the embodiment by persons skilled in the art without departing from the essence and gist of the invention, as set forth in the appended claims.

What is claimed is:

1. A method of starting operation of a solid polymer electrolyte fuel cell for generating electrical energy by electrochemical reactions taking place between an oxygen-containing gas and a fuel gas, the solid polymer electrolyte fuel cell being formed by stacking a membrane electrode assembly and separators, the membrane electrode assembly including a cathode and an anode as a pair of electrodes, and an electrolyte interposed between the cathode and the anode, the solid polymer electrolyte fuel cell having an oxygen-containing gas flow field for supplying the oxygen-containing gas to the cathode, and a fuel gas flow field for supplying the fuel gas to the anode, the method comprising the steps of:

performing gas replacement by supplying the fuel gas to the fuel gas flow field from a fuel gas discharge passage provided at a downstream side of the fuel gas flow field, and supplying the oxygen-containing gas to the oxygen-containing gas flow field from an oxygen-containing gas supply passage provided at an upstream side of the oxygen-containing gas flow field; and after the step of performing gas replacement, performing normal power generation by supplying the fuel gas to the fuel gas flow field from a fuel gas supply passage provided at an upstream side of the fuel gas flow field, and supplying the oxygen-containing gas to the oxygen-containing gas flow field from the oxygen-containing gas supply passage provided at the upstream side of the oxygen-containing gas flow field.

2. The operation starting method according to claim 1, wherein in the step of performing gas replacement, after the fuel gas has been supplied to the fuel gas flow field, the oxygen-containing gas is supplied to the oxygen-containing gas flow field.

3. The operation starting method according to claim 1, wherein the separator has a separator surface oriented vertically in the direction of gravity; and the fuel gas and the oxygen-containing gas are supplied through the fuel gas flow field and the oxygen-containing gas flow field from upper to lower positions thereof in the direction of gravity in the normal operation.

* * * * *